US006322929B1

(12) United States Patent
Takada et al.

(10) Patent No.: US 6,322,929 B1
(45) Date of Patent: Nov. 27, 2001

(54) LITHIUM SECONDARY BATTERY WITH A HIGH CHARGE-DISCHARGE EFFICIENCY AND A LOW SELF-DISCHARGING TENDENCY

(75) Inventors: Kazunori Takada, Osaka; Makoto Fujino, Moriguchi; Kazuya Iwamoto, Sakai; Shigeo Kondo, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/240,689

(22) Filed: Feb. 2, 1999

(30) Foreign Application Priority Data

Feb. 3, 1998 (JP) .................................. 10-021803

(51) Int. Cl.[7] ................................. H01M 6/18
(52) U.S. Cl. ................ 429/314; 429/317; 429/223; 429/224; 429/231.1
(58) Field of Search .................. 429/314, 224, 429/231.1, 223, 317

(56) References Cited

U.S. PATENT DOCUMENTS 5,631,104   5/1997   Zhong et al. .................. 429/194

FOREIGN PATENT DOCUMENTS

| 0656667 | 6/1995 | (EP) . |
| 0802575 | 10/1997 | (EP) . |
| 0829913 | 3/1998 | (EP) . |
| 08096836 | 4/1996 | (JP) . |
| 008138725 | 5/1996 | (JP) . |
| 08162151 | 6/1996 | (JP) . |
| 08217452 | 8/1996 | (JP) . |
| 09134724 | 5/1997 | (JP) . |
| 09293516 | 11/1997 | (JP) . |
| 98/04010 | 1/1998 | (WO) . |

OTHER PUBLICATIONS

J. Electrochem, Soc., vol. 144, No. 1, Jan. 1997, pp. 205–213.
Journal of Materials Chemistry, 1998, 8(4), pp. 837–839.
J. Electrochem. Soc., vol. 141, No. 9, Sep. 1994, pp. 2279–2282.
Solid State Ionics 81 (1995), pp. 167–170.
Database WPI Section Ch, Wook 9918, Derwent Publications, Ltd., London, GB; AN 99–207800 & JP 11025983.
A.K. Padhi, K.S. Nanjundaswamy, J.B. Goodenough: "Phospho–olivines as Positive–Electrode Materials for Rechargeable Lithium Batteries" Journal of Electromechanical Society, vol. 144, No. 4, Apr. 1997, pp. 1188–1194.
Kawai H, et al.: "A New Lithium Cathode Licomn04: Toward Practical 5 V Lithium Batteries" Electromechanical and Solid–State Letters, vol. 1, No. 5, Nov. 1, 1998, pp. 212–214.

*Primary Examiner*—Laura Weiner
(74) *Attorney, Agent, or Firm*—McDermott, Will & Emery

(57) ABSTRACT

A lithium secondary battery free from problems encountered with a positive electrode active material exhibiting an electrode potential of not lower than 4.5 volts versus Li—a deterioration in performances because of self-discharge with decomposition of the electrolyte. The lithium secondary battery uses a sulfide based lithium ion conductive solid electrolyte as the electrolyte. Thus, a lithium secondary battery with a very low self-discharge tendency, that is, with the decomposition of electrolyte highly controlled, can be obtained even using the positive electrode active material generating a high voltage.

15 Claims, 2 Drawing Sheets

LITHIUM SECONDARY BATTERY WITH A HIGH CHARGE-DISCHARGE EFFICIENCY AND A LOW SELF-DISCHARGING TENDENCY

BACKGROUND OF THE INVENTION

The present invention relates to a lithium secondary battery.

Recent years have witnessed the demand for batteries growing tremendously with development and spread of portable appliances such as personal computers and cellar phones. Especially in the lithium battery, researches have been actively conducted in various quarters as a power source which has a high energy density, because lithium is an element small in molcular weight yet capable of releasing a large amount of ionized energy.

Hitherto, the positive electrode active materials used for such a lithium battery were $MnO_2$, $V_2O_5$ and the like which could generate an electromotive force of the order of three volts. In recent years, a lithium battery of the order of four volts based on $LiCoO_2$ has been commercialized.

In seeking to further raise the battery power, researches have been carried out in active materials for a positive electrode which generate a higher electromotive force. The following substances have now been reported as ones with an electromotive force of 4.8 volts versus metallic lithium: oxides of lithium manganese with a spinel structure such as $LiNiVO_4$ (G. T. Fey, W. Li, and J. R. Dahn, J. Electrochem. Soc., vol. 141, 2279 (1994) of Reference 1); $LiCr_yMn_{2-y}O_4$ (C. Sigala, D, Guymard, A. Verbaere, Y. Piffard, and M. Tournoux, Solid State Ionics, vol. 81, 167 (1995) of Reference 2); $LiNi_xMn_{2-x}O_4$ (Q. Zhong, A. Banakdarpor, M. Zhang, Y. Gao, and J. R. Dahn, J. Electrochem. Soc., vol. 144, 205 (1997) of Reference 3); and $LiMn_{2-x-y}Ni_xCr_yO_4$ (Y. Todorov, C. Wang, B. I. Banov, and M. Yoshio, Electrochemical Society Proceedings, vol. 97 of 18, 176 (1997) of Reference 4); and phosphates with an olivine structure such as $LiCoPO_4$ (Japanese Laid-Open Patent Publication Hei 9-134724) of Reference 5).

In lithium batteries made with those positive electrode active materials of References 1 to 5, however, the electrolyte is exposed to a strong oxidation environment in the area where it comes in contact with the active materials, because those positive electrode active materials generate a high electromotive force. As a result, the lithium secondary batteries of that kind obtained present a number of problems.

In Reference 1, it is reported that since the oxidation reaction of the electrolyte takes place as secondary reaction, the discharge capacity decreases. References 2 and 3 indicate that because of a similar oxidation reaction of the electrolyte, the charge and discharge efficiency is low. Reference 4 points out that because of unstable electrolyte, the self-discharge of the battery is large.

Those observations are said of the compounds of the spinel structure. Lithium batteries made with compounds of the olivine structure, too, are small in discharged quantity of electricity as compared with charged quantity of electricity, that is, low in charge-discharge efficiency as shown in FIG. 5 of Reference 5.

As described, lithium secondary batteries made with those high voltage generating active materials for the positive electrode tended to self-discharge with the decomposition of the electrolyte and were low in charge-discharge efficiency. Furthermore, while not mentioned in the references, the decomposition of the electrolyte can deteriorate the long-term reliability resulting in shortened charge-discharge cycle life and other problems.

BRIEF SUMMARY OF THE INVENTION

It is an object of the present invention to provide a lithium secondary battery with a high charge-discharge efficiency and a low self-discharging tendency by keeping down the decomposition of the electrolyte—the problem encountered with the lithium secondary batteries constructed using the positive electrode active materials with a high electromotive force as described above.

The present invention provides a lithium secondary battery comprising a positive electrode which contains a transition metal compound exhibiting a potential of not lower than 4.5 volts versus Li, a negative electrode and a sulfide based lithium ion conductive solid electrolyte. According to the present invention, it is possible to keep charge-discharge efficiency of the battery from dropping and control the self-discharge tendency caused by decomposition of the electrolyte in spite of the positive electrode active material generating a high voltage being used in the battery.

The sulfide based lithium ion conductive solid electroly used in the present invention comprises a glass network former sulfide and a glass network modifier sulfide.

In a preferred mode of the present invention, the glass network former sulfide is selected from the group consisting of $SiS_2$, $B_2S_3$ and $P_2S_5$, and the glass network modifier sulfide is $LiS_2$.

In another preferred mode of the present invention, the sulfide based lithium ion conductive solid electrolyte contains bridging oxygen and silicons bonded to the bridging oxygen.

The sulfide based solid electrolyte containing the above-mentioned bridging oxygen can be produced by melting and quenching a mixture of materials including a glass network former sulfide, a glass network modifier sulfide and an oxygen source such as an oxide and oxysalt of lithium. In the resultant solid electrolyte, the bridging oxygen is one generated from the above-mentioned oxygen source.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
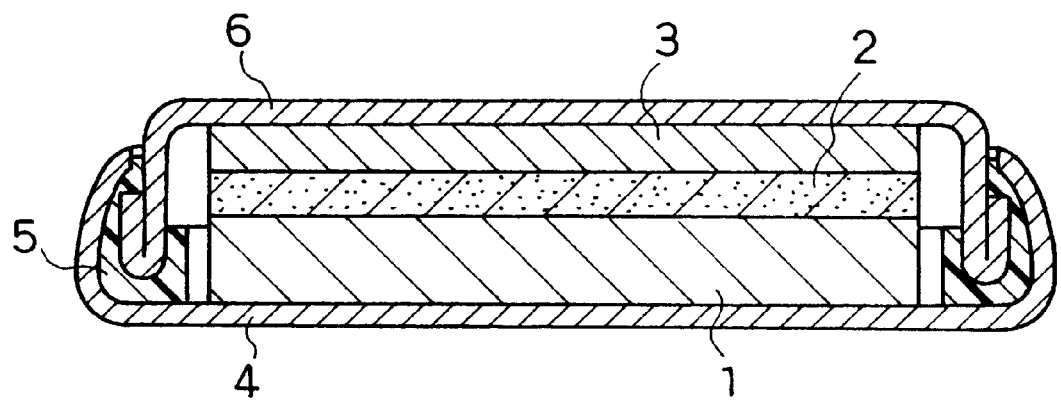
FIG. 1 is a vertical, sectional view of a lithium secondary battery in an embodiment of the present invention.

The present invention makes it possible to provide a lithium secondary battery with a high electromotive force and high charge-discharge efficiency and a low self-discharging tendency by using a sulfide based lithium ion conductive solid electrolyte as the electrolyte that can keep down the decomposition of the electrolyte caused by a positive electrode containing a transition metal compound exhibiting a potential of not lower than 4.5 V versus Li.

The electrolyte is decomposed as the anion or solvent in the electrolyte is oxidized at the positive electrode.

No solvent to be decomposed is present in the lithium ion conductive solid electrolyte used in the present invention. Furthermore, usually, only lithium ions move in an inorganic lithium ion conductive solid electrolyte and anions do not migrate. Therefore, anions may be decomposed on the electrode surface, but the oxidation reaction is confined to the reaction interface because reactant anions are not continuously supplied to the reaction interface. That is, even if an electrode active material generating a high potential as mentioned is used, it is possible to control such problems as decreased charge-discharge efficiency and violent self-discharge due to the decomposition of the electrolyte by using a lithium ion conductive solid electrolyte as the electrolyte.

In the present invention, a sulfide based lithium ion conductive solid electrolyte is used as a lithium ion conductive solid electrolyte for the following reason: It is desired to use a lithium ion conductive solid electrolyte with a high ionic conductivity so as to improve the current drain. Amorphous (glassy) sulfide based lithium ion conductive solid electrolytes such as $Li_2S$—$SiS_2$, $Li_2S$—$B_2S_3$ and $Li_2S$—$P_2S_5$ are suitable for the purpose, because they have a high ionic conductivity of not lower than $10^{-4}$S/cm.

But the decomposition voltage of the sulfide based lithium ion conductive solid electrolytes as calculated from thermodynamic determination is low as compared with the equilibrium potential of the positive electrode active material generating a high potential. For example, while it is varied depending on the composition, the decomposition voltage of solid electrolytes of the $Li_2S$—$SiS_2$ system as calculated from the formation energy is about three volts at the highest. Theoretically, therefore, a lithium secondary battery could not be made using such an electrolyte and an electrode active material exhibiting a high potential of not lower than 4.5 volts versus Li. However, while the combination of a positive electrode active material exhibiting a high equilibrium potential of not lower than 4.5 volts versus Li and those sulfide based lithium ion conductive solid electrolytes are thermodynamically in a non-equilibrium state, it is practically possible to constitute a lithium secondary battery which exhibits the same performance as when no decomposition reaction of the electrolyte takes place through the mechanism which will be described later. The present invention is based on this finding.

No isolated anions are present in those sulfide based lithium ion conductive solid electrolytes but only mobile lithium ions and anionic glass network alone are observed. In a solid electrolyte of the $Li_2S$—$SiS_2$ system, one of the sulfide based lithium ion conductive solid electrolytes, for example, sulfur is present not as isolated ion of $S^{2-}$ but incorporated in the form of a glass network formed of a series of $SiS_4^{4-}$. To oxidize sulfur, therefore, huge energy is necessary to cut off the Si—S covalent bond. That is, a large amount of activation energy is needed for the electrolyte to oxidize. Such an electrolyte is highly stable and resistant to electrochemical oxidation reaction.

It is also noted that it is desirable that the sulfide based lithium ion conductive solid electrolytes do not contain iodine or bromine. The reason is this:

If a lithium halide such as lithium iodide and lithium bromide is added to the aforesaid sulfide based lithium ion conductive solid electrolytes, a higher lithium ion conductivity can be obtained. One to which lithium iodide is added has still a higher ionic conductivity of the order of $10^{-3}$S/cm. In sulfide based solid electrolytes to which lithium iodide is added, however, lithium iodide is observed forming micro domains, with iodine present as iodide ions. When coming in contact with a high-potential positive electrode active material, iodide ions in the micro domains are easy to oxidize unlike sulfur covalent bonded in the glass network. While the resultant decomposition reaction of the electrolyte is limited to and near the surface of the electrode, reaction products will not migrate or dissipate in the solid electrolyte, and therefore reaction products such as iodine produced by oxidation of iodide ions cover the surface of the electrode active material, hindering the electrode reaction. For this reason, it is desirable to use solid electrolytes in which the content of iodine or bromine is zero or too small to affect the battery reaction.

Also, it is preferable to use sulfide based lithium ion conductive solid electrolytes which contain bridging oxygen and silicons bonded to that bridging oxygen. The reason for that is this:

As mentioned earlier, the known sulfide based lithium ion conductive solid electrolytes include $Li_2S$—$SiS_2$, $Li_2S$—$B_2S_3$ and $Li_2S$—$P_2S_5$. Those solid electrolytes are generally synthesized by melting a mixture of starting materials at a high temperature, followed by quenching. $Li_2S$—$SiS_2$ is the most suitable for mass production on an industrial scale, because $SiS_2$ is higher than $B_2S_3$ and $P_2S_5$ in vapor pressure and therefore the dissipation of starting materials in the synthesis of electrolyte is smaller.

Solid electrolytes of the $Li_2S$—$SiS_2$ system exhibit lithium ion conductivity when $SiS_2$ as a glass network-former sulfide forms a glass network and $Li_2S$ is added as a glass network-modifier. To improve an ionic conductivity, therefore, it is desirable to prepare a composition with a high content of $Li_2S$. But if the content of $Li_2S$ is high, the stability of the glass network will decrease, resulting in crystallization and a decreased ionic conductivity.

Sulfur in $Li_2S$—$SiS_2$ is classified into bridging sulfur represented by

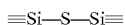

and non-bridging sulfur represented by

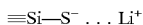

If part of $Li_2S$—$SiS_2$ is substituted with oxygen, then oxygen selectively substitutes for bridging sulfur, forming a structure of silicons bonded to bridging oxygen (≡Si—O—Si≡). As used herein, the symbols —, ≡ indicate a covalent bond while the symbol . . . indicates an ionic bond. In case inter-silicon bond is created by bridging oxygen, the inter-silicon bond will be strong as compared with that by bridging sulfur and the stability of the glass network will be increased. That makes it possible to glass with a high glass network modifier sulfide content composition and to obtain a sulfide based lithium ion conductive solid electrolyte with a high ionic conductivity.

Meanwhile, in case the non-bridging sulfur which contributes to the bond with lithium ion is substituted with oxygen, the electrostatic attraction with lithium ion will be strong, limiting the migration of lithium ion and decreasing the ionic conductivity. For this reason, it is desirable for the non-bridging site to be occupied with sulfur.

It is also noted that if the bridging sulfur in a structure represented by $$\equiv Si-S-Si^*-S^- \ldots Li^+$$

is substituted with oxygen, the structure will change to one represented by $$\equiv Si-O-Si^*-S^- \ldots Li^+$$

and as a result, the shell electron in silicon (Si*) bonded to the non-bridging sulfur will be strongly attracted by oxygen, and the cationicity of Si* will be strong. And so will the bond between Si* and the bridging sulfur (S⁻). As a result, the non-bridging sulfur will get still harder to decompose by oxidation, and produce better results when combined with a positive electrode active material generating a high potential.

Sulfide based lithium ion conductive solid electrolytes which contain bridging oxygen and silicons bonded to that bridging oxygen can be obtained by melting and quenching a mixture of lithium sulfide, silicon sulfide, and an oxygen source such as lithium oxide $Li_2O$, lithium oxysalts $Li_3PO_4$ and $Li_4SiO_4$ as starting materials.

Seeing that liquid electrolyte is especially unstable in a positive electrode active material exhibiting an electrode potential of not lower than 4.5 volts versus Li which are used in the lithium secondary battery of the present invention, the effect of the present invention using the sulfide based solid electrolyte is especially great.

The following are preferred examples of positive electrode active material exhibiting an electrode potential of not lower than 4.5 volts versus Li:

1) lithium-contained transition metal oxide with a normal spinel structure represented by the general formula:

$$Li_{1-y}Mn_{2-x}Me_xO_4,$$

where Me represents a transition metal selected from the group consisting of Co, Cr, Cu and Fe, and where $0 < x \leq 1$ and $0 \leq y \leq 1$

2)

$$Li_{1-y}Mn_{2-x}Ni_xO_4,$$

where $0 < x \leq 0.5$, 3) lithium-contained phosphate having an olivine structure represented by the general formula:

$$Li_{1-y}MePO_4$$

where Me represents a transition metal selected from the group consisting of Co, Ni, and Fe, and where $0 \leq y \leq 1$, 4) lithium contained transition metal oxide having an inversed spinel structure represented by the general formula:

$$Li_{1-y}NiVO_4$$

where $0 \leq y \leq 1$.

Electrode potentials versus Li obtained from representative positive electrode active materials are shown below:

| | |
|---|---|
| $Li_{1-y}NiVO_4$ | 4.8V vs Li |
| $Li_{1-y}Mn_{2-x}Ni_xO_4$ | 4.7V vs Li |
| $Li_{1-y}Mn_{2-x}Fe_xO_4$ | 4.7V vs Li |
| $Li_{1-y}Mn_{2-x}Cu_xO_4$ | 4.9V vs Li |
| $Li_{1-y}Mn_{2-x}Co_xO_4$ | 5.0V vs Li |
| $Li_{1-y}CoPO_4$ | 4.8V vs Li |

Figure 3:
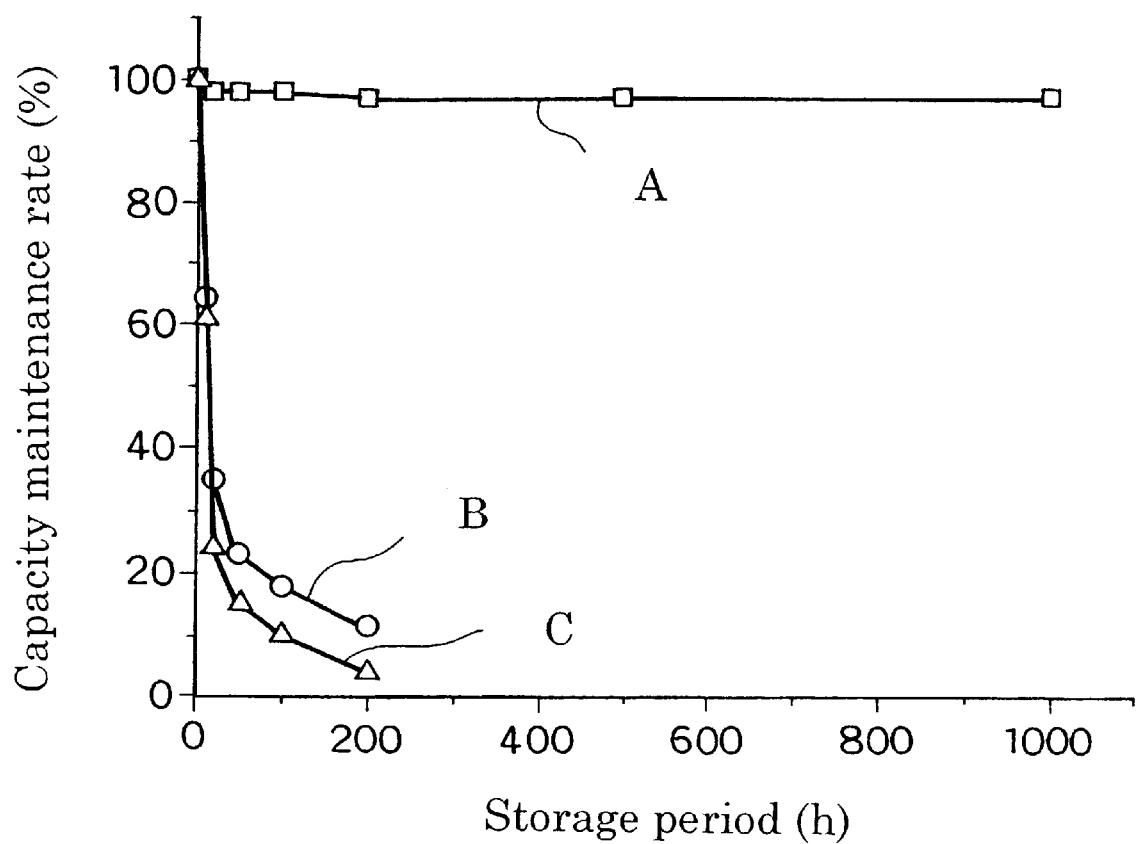
FIG. 3 depicts curves showing the relationship between the time left standing and capacity maintenance rate of lithium secondary batteries.

Lithium-contained transition metal oxides with a normal spinel structure represented by $LiMn_{2-x}Me_xO_4$ (Me=Ni, Cr, Co) show a potential plateau around 4 volts and 4.7 volts or around 4 volts and 5 volts as shown in FIG. 3 of Reference 3. As far as lithium secondary batteries using such electrode active materials showing a potential profile with two or more steps are concerned, the present invention concerns ones exhibiting an positive electrode potential of not lower than 4.5 volts versus Li in service.

Negative electrode materials using lithium as an active material include metallic lithium, a lithium alloy capable of absorbing and desorbing lithium in a reversible manner such as Li—Al alloy, and materials capable of intercalating and deintercalating lithium in a reversible manner such as carbon materials, transition metal oxides, transition metal sulfides and transition metal nitrides.

Now, the embodiments of the present invention will be described in details.

Embodiment 1

In the present embodiment, a lithium secondary battery was fabricated in the following way using a lithium-contained transition metal oxide represented by $LiNi_{0.5}Mn_{1.5}O_4$ as a positive electrode active material exhibiting an electrode potential of not lower than 4.5 volts versus Li, an amorphous solid electrolyte represented by $0.01Li_3PO_4$—$0.63Li_2S$—$0.36SiS_2$ as a sulfide based lithium ion conductive solid electrolyte and metallic lithium as a negative electrode active material, and the characteristics of the battery were evaluated.

The sulfide based lithium ion conductive solid electrolyte was first synthesized this way:

Lithium phosphate ($Li_3PO_4$), lithium sulfide ($Li_2S$) and silicon sulfide ($SiS_2$) as starting materials were mixed in a mol ratio of 1:63:36, and the mixture of those starting materials was placed in a crucible made of glassy carbon. The crucible was then put in a vertical furnace and the mixture was heated up to 950° C. in an argon current and melted. After heating for two hours, the melt was dropped on a twin roll and quenched to give a lithium ion conductive solid electrolyte represented by $0.01Li_3PO_4$—$0.63Li_2S$—$0.36SiS_2$.

The positive electrode active material $LiNi_{0.5}Mn_{1.5}O_4$ was synthesized this way:

The starting materials lithium hydroxide (LiOH), a hydrate of nickel nitrate ($Ni(NO_3)_2 \cdot 6H_2O$) and manganese dioxide ($MnO_2$) were mixed in a mol ratio of 4:1:6 and heated for 24 hours at 600° C. The mixture was then cooled slowly in the furnace to produce a lithium-contained transition metal oxide represented by $LiNi_{0.5}Mn_{1.5}O_4$.

Then, the solid electrolyte and $LiNi_{0.5}Mn_{1.5}O_4$ thus obtained were mixed in a proportion of 1:1 by weight. And 5 parts by weight of graphite in a fibrous form as a conductive agent was added to 95 parts by weight of the mixture to produce a positive electrode material.

For a negative electrode, metallic lithium foil 0.1 mm thick was punched out in the form of a disk 9.4 mm in diameter.

A sectional view of lithium secondary battery of the present embodiment is shown in FIG. 1. In FIG. 1, the reference numeral 1 indicates a positive electrode formed by weighing out so much of the produced positive electrode material that the weight of the active material is 50 mg. The reference numeral 2 indicates a lithium ion conductive solid electrolyte layer which was pressure-formed integrally with the positive electrode 1, followed by pressing a negative electrode metallic lithium foil 3 thereupon. The pellet thus integrally formed was placed in a stainless steel battery case 4. The opening of the case 4 was sealed with a stainless steel lid 6 via an insulating gasket 5.

As a comparative example, a lithium secondary battery was constructed using a nonaqueous solvent as an electrolyte in the following way.

The positive electrode active material $LiNi_{0.5}Mn_{1.5}O_4$ was prepared in the same way as in the preceding embodiment. Ninety (90) parts by weight of the $LiNi_{0.5}Mn_{1.5}O_4$, 5 parts by weight of graphite fibers conductive agent and 5 parts by weight of fluorocarbon resin were mixed. This mixture was weighed in such a quantity that the weight of $LiNi_{0.5}Mn_{1.5}O_4$ in the mixture is 50 mg, and then filled into a high chrome stainless steel mesh in the form of a disk 9.4 mm in diameter to produce a positive electrode.

As an nonaqueous electrolyte, the following two were used: one (electrolyte "a") prepared by dissolving 1M lithium phosphofluoride ($LiPF_6$) in a solvent mixture prepared of ethylene carbonate and ethyl methyl carbonate in a ratio of 1:1 by volume and the other (electrolyte "b") prepared by 1M $LiPF_6$ in polypropylene carbonate.

Figure 2:
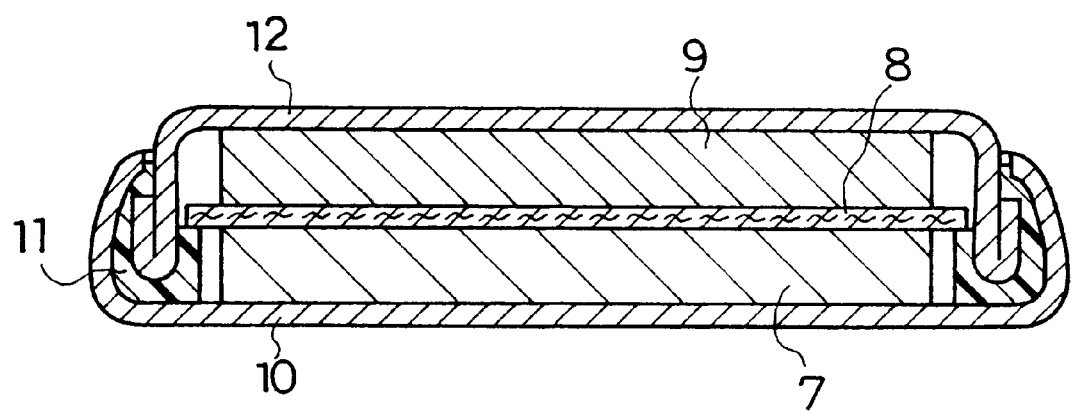
FIG. 2 is a vertical, sectional view of a lithium secondary battery in a comparative example.

A lithium battery having a section shown in FIG. 2 was fabricated by combining those positive electrode pellet and nonaqueous electrolytes with a negative electrode made of metallic lithium foil 0.24 mm in thickness and a separator made of polypropylene porous film 50 $\mu$m in thickness. Then, the positive electrode pellet 7, separator 8 and negative electrode 9 were inserted in a stainless steel battery case, and after the nonaqueous electrolyte was filled, the case was sealed with a lid 12 via a gasket 11. It is understood that the lithium secondary battery made using electrolyte "a" as the nonaqueous electrolyte will be hereinafter called lithium secondary battery B and the other battery made with electrolyte "b" will be hereinafter referred to as lithium secondary battery C.

The lithium batteries thus constructed were tested for self-discharging characteristics in the following way:

First, the batteries were charged at a constant voltage of 4.9 volts for 24 hours at room temperature (25° C.). The charged batteries were then left standing in a constant-temperature bath at 60° C. After that, the batteries were let to discharge at a constant current of 100 $\mu$A until the terminal voltage decreased to 3.5 volts to measure the discharge capacity of the battery.

When discharged after left standing for a short time following charging, each lithium secondary battery showed a high discharge voltage at about 4.5 volts. It showed that the positive electrode active material used in the present embodiment exhibited an electrode potential of not lower than 4.5 volts versus Li.

The results of the storage test, that is, relation between the time of storage and the discharge capacity is shown in FIG. 3. In FIG. 3, the abscissa indicates the time of storage at 60° C. and the ordinate indicates the capacity maintenance rate, that is, the ratio of the discharge capacity of the lithium secondary battery after storage to the discharge capacity of the battery immediately after charging. Little drop in discharge capacity was observed after storage at 60° C. with lithium secondary battery A made using a sulfide based lithium ion conductive solid electrolyte as the electrolyte according to the present invention. On the other hand, batteries B and C made with the nonaqueous electrolyte were observed to sharply fall in discharge capacity with time of storage. It is thought that the decomposition of the electrolyte caused those batteries to self-discharge violently.

The test confirmed that it was possible to keep down the decomposition reaction of the electrolyte in a battery made with a positive electrode active material generating high voltage and thus a lithium secondary battery with a very low self-discharge tendency can be obtained according to the present invention.

Embodiment 2

In this embodiment, a lithium secondary battery was made in the same manner as in Embodiment 1 except that a sulfide based lithium ion conductive solid electrolyte represented by $0.05Li_4SiO_4 13\ 0.60Li_2S—0.35SiS_2$ was used as the electrolyte in place of the amorphous solid electrolyte represented by $0.01Li_3PO_4—0.63Li_2S—0.36SiS_2$ used in Embodiment 1 and that graphite was used as the negative electrode material, and the characteristics of the battery were evaluated.

The sulfide based lithium ion conductive solid electrolyte represented by $0.05Li_4SiO_4—0.60Li_2S—0.35SiS_2$ was synthesized in the same way as in Embodiment 1 except that a mixture of lithium orthosilicate ($Li_4SiO_4$), lithium sulfide and silicon sulfide in a mol ratio of 5:60:35 was used as starting materials.

As the positive electrode material was used a mixture prepared of the solid electrolyte obtained above and $LiNi_{0.5}Mn_{1.5}O_4$ produced in Embodiment 1 in a ratio of 1:1 by weight. The negative electrode material used was a mixture prepared of the above-mentioned solid electrolyte and graphite in a ratio of 1:1 by weight.

Then, 100 mg of the positive electrode material and 50 mg of the negative electrode material were weighed and made into a lithium secondary battery in the same manner as in Embodiment 1.

The self-discharge characteristics of the lithium secondary battery samples thus made were tested in the same way as in Embodiment 1. All the lithium secondary battery samples were not lower than 97 percent in capacity maintenance rate when stored for 1,000 hours.

The test confirmed that it was possible to keep down the decomposition reaction of the electrolyte in a battery made with a positive electrode active material generating high voltage and thus a lithium secondary battery with a very low self-discharge tendency can be obtained according to the present invention.

Embodiment 3

In this embodiment, a lithium secondary battery was made in the same manner as in Embodiment 1 except that a sulfide based lithium ion conductive solid electrolyte represented by $0.05Li_2O—0.60Li_2S—0.35SiS_2$ was used as the electrolyte in place of the amorphous solid electrolyte represented by $0.01Li_3PO_4—0.63Li_2S—0.36SiS_2$ used in Embodiment 1 and that metallic indium was used as the negative electrode material, and the characteristics of the battery were evaluated.

The sulfide based lithium ion conductive solid electrolyte represented by $0.05Li_4SiO_4—0.60Li_2S—0.35SiS_2$ was synthesized in the same way as in Embodiment 1 except that a mixture prepared of lithium orthosilicate ($Li_4SiO_4$), lithium sulfide and silicon sulfide in a mol ratio of 5:60:35 was used as starting materials.

Using indium foil 0.1 mm thick punched out into a disk 9.4 mm in diameter as the negative electrode, a lithium secondary battery was constructed in the same way as in Embodiment 1.

To study the self-discharge characteristics, the lithium secondary battery was charged at 4.3 volts since the negative electrode showed a potential of about 0.6 volts versus metallic lithium electrode. Except that the charging voltage was changed, the self-discharge characteristics were tested in the same way as in Embodiment 1. All the lithium secondary battery samples were not lower than 98 percent in capacity maintenace rate when stored for 1,000 hours.

The test confirmed that it was possible to keep down the decomposition reaction of the electrolyte in a battery made with a positive electrode active material generating high voltage and thus a lithium secondary battery with a very low self-discharge tendency can be obtained according to the present invention.

Embodiment 4

In this embodiment, a lithium secondary battery was made in the same manner as in Embodiment 1 except that a sulfide based lithium ion conductive solid electrolyte represented by $0.6Li_2S$—$0.4SiS_2$ was used as the electrolyte in place of the amorphous solid electrolyte represented by $0.01Li_3PO_4$—$0.63Li_2S$—$0.36SiS_2$ used in Embodiment 1, and the characteristics of the battery were evaluated.

The sulfide based lithium ion conductive solid electrolyte represented by $0.6Li_2S$—$0.4SiS_2$ was synthesized in the same way as in Embodiment 1 except that a mixture prepared of lithium sulfide and silicon sulfide in a mol ratio of 6:4 was used as starting materials.

Using the sulfide based lithium ion conductive solid electrolyte thus prepared, a lithium secondary battery was made and tested for the self-discharge characteristics. The lithium secondary battery was not lower than 95 percent in capacity maintenance rate when stored for 1,000 hours.

The test confirmed that the lithium secondary battery thus made was extremely small in self-discharge when compared with the lithium secondary battery constructed using the nonaqueous electrolyte by way of comparison in Embodiment 1, though somewhat lower in capacity maintenance rate than those lithium secondary batteries made in Embodiments 1 to 3. The following can be thought of as a reason that the lithium secondary battery was slightly lower in capacity maintenance rate than those lithium secondary batteries made in Embodiments 1 to 3: the sulfide based lithium ion conductive solid electrolyte used in the present embodiment did not have a bridging oxygen structure and was rather lower in oxidation resistance than those in Embodiments 1 to 3.

Embodiment 5

In this embodiment, a lithium secondary battery was made in the same manner as in Embodiment 1 except that a sulfide based lithium ion conductive solid electrolyte represented by $0.6Li_2S$—$0.4P_2S_5$ was used as the electrolyte in place of the amorphous solid electrolyte represented by $0.01Li_3PO_4$—$0.63Li_2S$—$0.36SiS_2$ used in Embodiment 1 and the characteristics of the battery were evaluated.

Lithium sulfide ($Li_2S$) and phosphorus sulfide ($P_2S_5$) were first mixed as starting materials in a mol ratio of 3:2. This mixture was placed and sealed in a quartz tube and melted at 900° C. Then the quartz tube was dropped in water to quench the melt, and an amorphous solid electrolyte represented by $0.6Li_2S$—$0.4P_2S_5$ was obtained.

Using the sulfide based lithium ion conductive solid electrolyte thus prepared, a lithium secondary battery was made and tested for the self-discharge characteristics. The lithium secondary battery was not lower than 94 percent in capacity maintenance rate when stored for 1,000 hours. The test confirmed that the lithium secondary battery thus made was extremely small in self-discharge when compared with the lithium secondary battery constructed using the nonaqueous electrolyte by way of comparison in Embodiment 1, though somewhat lower in capacity maintenance rate than those lithium secondary batteries made in Embodiments 1 to 3. The following can be thought of as a reason that the lithium secondary battery was slightly lower in capacity maintenance rate than those lithium secondary batteries made in Embodiments 1 to 3: the sulfide based lithium ion conductive solid electrolyte used in the present embodiment had no bridging oxygen structure and was rather lower in oxidation resistance than those in Embodiments 1 to 3.

Embodiment 6

In this embodiment, a lithium secondary battery was made in the same manner as in Embodiment 1 except that a lithium ion conductive amorphous solid electrolyte represented by $0.5Li_2S$—$0.5B_2S_3$, also one of the sulfide based lithium ion conductive solid electrolytes, was used as the electrolyte in place of the amorphous solid electrolyte represented by $0.01Li_3PO_4$—$0.63Li_2S$—$0.36SiS_2$ used in Embodiment 1, and the characteristics of the battery were evaluated.

The amorphous solid electrolyte represented by $0.5Li_2S$—$0.5B_2S_3$ was first prepared in the same way as in Embodiment 5 except that a mixture of lithium sulfide ($Li_2S$) and boron sulfide ($B_2S_3$) in a mol ratio of 1:1 was used as starting materials.

Using the sulfide based lithium ion conductive solid electrolyte thus prepared, a lithium secondary battery was made and tested for the self-discharge characteristics. The lithium secondary battery was not lower than 92 percent in capacity maintenance rate when stored for 1,000 hours. The test confirmed that the lithium secondary battery thus made was extremely small in self-discharge when compared with the lithium secondary battery constructed using the nonaqueous electrolyte by way of comparison in Embodiment 1, though somewhat lower in capacity maintenance rate than those lithium secondary batteries made in Embodiments 1 to 3. The following can be thought of as a reason that the lithium secondary battery was slightly lower in capacity maintenance rate than those lithium secondary batteries made in Embodiments 1 to 3: the sulfide based lithium ion conductive solid electrolyte used in the present embodiment did not have a bridging oxygen structure and was rather lower in oxidation resistance than those in Embodiments 1 to 3.

Embodiment 7

In this embodiment, a lithium secondary battery was made in the same manner as in Embodiment 1 except that a sulfide based lithium ion conductive solid electrolyte represented by $0.30LiI$—$0.35Li_2S$—$0.35P_2S_5$ was used as the electrolyte in place of the amorphous solid electrolyte represented by $0.01Li_3PO_4$—$0.63Li_2S$—$0.36SiS_2$ used in Embodiment 1, and the characteristics of the battery were evaluated.

The sulfide based lithium ion conductive solid electrolyte represented by $0.30LiI$—$0.35Li_2S$—$0.35P_2S_5$ was prepared in the same way as in Embodiment 1 except that a mixture of lithium iodide (LiI), lithium sulfide and silicon sulfide in a mol ratio of 6:7:7 was used as starting materials.

Using the sulfide based lithium ion conductive solid electrolyte thus prepared, a lithium secondary battery was made and tested for the self-discharge characteristics. The lithium secondary battery was not lower than 87 percent in capacity maintenance rate when stored for 1,000 hours. The test confirmed that the lithium secondary battery thus made was extremely small in self-discharge when compared with the lithium secondary battery constructed using the nonaqueous electrolyte by way of comparison in Embodiment 1, though somewhat lower in capacity maintenance rate than those lithium secondary batteries made in Embodiments 1 to 3 and also in Embodiments 4 to 6. The following can be thought of as a reason that the lithium secondary battery was slightly lower in capacity maintenance rate than those lithium secondary batteries made in Embodiments 1 to 6: the sulfide based lithium ion conductive solid electrolyte used in the present embodiment contained iodine, which was oxidized when coming in contact with the positive electrode active material exhibiting a high potential.

Embodiment 8

In this embodiment, a lithium secondary battery was made in the same manner as in Embodiment 1 except that $LiCr_{0.8}Mn_{1.2}O_4$ was used as the transition metal oxide exhibiting an electrode potential of not lower than 4.5 volts versus Li in place of $LiNi_{0.5}Mn_{1.5}O_4$. In parallel, a comparative lithium battery was constructed using the nonaqueous electrolyte in the same way. Those batteries were tested for the self-discharge characteristics.

$LiCr_{0.8}Mn_{1.2}O_4$ was synthesized by mixing lithium oxide ($Li_2CO_3$), manganese carbonate ($MnCO_3$) and chromium carbonate ($Cr_2O_3$) in a mol ratio of 0.5:1.2:0.4, followed by heating in the atmosphere for 24 hours at 750° C.

Using the positive electrode active material thus obtained, lithium secondary battery D according to the present invention was made along with a comparative lithium secondary battery E (using the electrolyte "a") and another comparative lithium secondary battery F (using electrolyte "b"), and their self-discharge characteristics were tested in the same way as in Embodiment 1.

All the batteries exhibited a high discharge voltage around 4.5 volts. After 1,000 hours of storage at 60° C., the lithium secondary battery using the lithium ion conductive solid electrolyte as the electrolyte according to the present invention hardly dropped in discharge capacity, with the capacity maintenance rate at not lower than 97 percent, but the lithium secondary batteries E and F constructed by way of comparison dropped sharply in capacity maintenance rate when stored for 200 hours, some dropping down to not higher than 15 percent.

Those findings indicated that the decomposition reaction of the electrolyte caused when a positive electrode active material generating a high voltage was used could be kept down and a lithium secondary battery with a very low self-discharge could be obtained according to the present invention.

Embodiment 9

In this embodiment, a lithium secondary battery was made in the same manner as in Embodiment 1 except that $LiNiVO_4$ was used as the transition metal oxide exhibiting an electrode potential of not lower than 4.5 volts versus Li in place of $LiNi_{0.5}Mn_{1.5}O_4$. In parallel, a comparative lithium battery was constructed using the nonaqueous electrolyte in the same way. Those batteries were tested for the self-discharge characteristics.

$LiNiVO_4$ was synthesized by mixing lithium carbonate ($Li_2CO_3$), nickel carbonate ($NiCO_3$) and vanadium oxide ($V_2O_5$) in a mol ratio of 1:2:1, followed by heating in the atmosphere for 24 hours at 600° C.

Using the positive electrode active material thus obtained, lithium second battery G according to the present invention was made together with a comparative lithium secondary battery H (using the electrolyte "a") and another comparative lithium secondary battery I (using electrolyte "b"), and their self-discharge characteristics were tested in the same way as in Embodiment 1.

All the batteries exhibited a high discharge voltage around 4.5 volts. After 1,000 hours of storage at 60° C., the lithium secondary battery using the lithium ion conductive solid electrolyte as the electrolyte according to the present invention hardly dropped in discharge capacity with the capacity maintenance rate at not lower than 96 percent, but the lithium secondary batteries E and F constructed by way of comparison dropped sharply in capacity maintenance rate after stored for 200 hours, some dropping down to not higher than 10 percent.

Those findings indicated that the decomposition reaction of the electrolyte caused when a positive electrode active material generating a high voltage was used could be kept down and a lithium secondary battery with a very low self-discharge could be obtained according to the present invention.

Embodiment 10

In this embodiment, a lithium secondary battery was made in the same manner as in Embodiment 1 except that $LiCoPO_4$ was used as the transition metal oxide exhibiting an electrode potential of not lower than 4.5 volts versus Li in place of $LiNi_{0.5}Mn_{1.5}O_4$. In parallel, a comparative lithium battery was constructed using the nonaqueous electrolyte in the same way. Those batteries were tested for the self-discharge characteristics.

$LiCoPO_4$ was synthesized by mixing lithium carbonate ($Li_2CO_3$), cobalt oxide ($CO_3O_4$) and phosphorus oxide ($P_2O_5$) in a mol ratio of 3:2:3, followed by heating in the atmosphere for 24 hours at 800° C.

Using the positive electrode active material thus obtained, lithium second battery J according to the present invention was made along with a comparative lithium secondary battery K (using the electrolyte "a") and another comparative lithium secondary battery L (using electrolyte "b"), and their self-discharge characteristics were tested in the same way as in Embodiment 1.

All the batteries exhibited a high discharge voltage around 4.5 volts. After 1,000 hours of storage at 60° C., the lithium secondary battery using the lithium ion conductive solid electrolyte as the electrolyte according to the present invention hardly dropped in discharge capacity, with the capacity maintenance rate at not lower than 94 percent, but the lithium secondary batteries E and F constructed by way of comparison dropped sharply in capacity maintenance rate after stored for 200 hours, some dropping down to not higher than 15 percent.

Those findings indicated that the decomposition reaction of the electrolyte caused when a positive electrode active material generating a high voltage was used could be kept down and a lithium secondary battery with a very low self-discharge could be obtained according to the present invention.

The embodiments of the present invention that have been described involve $LiNi_{0.5}Mn_{1.5}O_4$, $LiCr_{0.8}Mn_{1.2}O_4$, $LiNiVO_4$ and $LiCoPO_4$ as the positive electrode active material exhibiting an electrode potential of 4.5 volts versus Li. The same results can be obtained with other lithium-contained transition metal oxides of the normal spinel structure such as $Li_{1-y}Mn_{2-x}Me_xO_4$ (Me=Co, Cr, Cu, Ni, Fe), also with those containing two or more transition metal elements as Me, or with those compositions containing compounds in which the normal spinel structure and the inverse spinel structure are mixed. Furthermore, the same effect can be achieved with $Li_{1-y}MePO_4$ (Me=Co, Ni, Fe) as the lithium-contained phosphates having the olivine structure, and also those compounds with part of the transition metal substituted with another element. Thus, the present invention is not limited to those positive electrode active materials exhibiting a potential of not lower than 4.5 volts versus Li which are described in the preceding embodiments.

It is also noted that the preceding embodiments of the present invention describe lithium secondary batteries made using metallic lithium, graphite-lithium compound, lithium-indium alloy as negative electrode active material. It goes without saying that the same effect can be obtained with transition metal oxides such as $Li_{4/3}Ti_{5/3}O_4$ and $LiTi_2O_4$, transition metal sulfides such as $TiS_2$, transition metal nitrides such as $Li_{2.6}Co_{0.4}N$, $Li_3FeN$, $Li_{2.5}Ni_{0.5}N$ and $Li_3MnN_2$, and the like. Thus, the present invention is not limited to those lithium secondary batteries using the negative electrode active materials described in the preceding embodiments.

Also, in the embodiments of the present invention, there are described only the $Li_2S$—$SiS_2$ system and the like as the sulfide based lithium ion conductive solid electrolyte. Needless to say, the same results can be achieved with other solid electrolytes than those described in the preceding embodiments such as $Li_2S$—$Al_2S_3$. Also, the same effect can be attained with other sulfide based lithium ion conductive solid electrolytes than those described in the embodiments such as $LiBO_2$—$Li_2S$—$SiS_2$ as the lithium ion conductive solid electrolyte. Thus, the present invention is not limited to those lithium secondary batteries made with sulfide based lithium ion conductive solid electrolytes described in the preceding embodiments.

As has been described, the present invention can keep down the decomposition reaction of the electrolyte in lithium secondary batteries made using a positive electrode active material exhibiting a high voltage—ones including a positive electrode containing a transition metal compound which exhibits a potential of not lower than 4.5 volts to the metallic lithium electrode—by using a sulfide based lithium ion conductive solid electrolyte in the electrolyte layer. Thus a lithium secondary battery with a very low self-discharge can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A lithium secondary battery comprising a positive electrode which contains a transition metal compound exhibiting a potential of not lower than 4.5 volts versus Li, a negative electrode and a sulfide based lithium ion conductive solid electrolyte.

2. The lithium secondary battery in accordance with claim 1, wherein said solid electrolyte comprises a glass network former sulfide and a glass network modifier sulfide.

3. The lithium secondary battery in accordance with claim 2, wherein said glass network former sulfide is selected from the group consisting of $SiS_2$, $B_2S_3$ and $P_2S_5$, and said glass network modifier sulfide is $Li_2S$.

4. The lithium secondary battery in accordance with claim 2, wherein said solid electrolyte contains bridging oxygen and silicons bonded to said bridging oxygen.

5. The lithium secondary battery in accordance with claim 4, wherein said bridging oxygen is generated from an oxide or oxysalt of lithium.

6. The lithium secondary battery in accordance with claim 4, wherein said bridging oxygen is generated from the group consisting of $Li_2O$, $Li_3PO_4$ and $Li_4SiO_4$.

7. The lithium secondary battery in accordance with claim 4, wherein said solid electrolyte is one obtained by a process comprising the steps of:

melting a mixture of materials including a glass network former, a glass network modifier and an oxygen source selected from an oxide of lithium and an oxysalt of lithium to obtain a melt, and quenching the melt.

8. The lithium secondary battery in accordance with claim 1, wherein said transition metal compound is a lithium-contained transition metal oxide, said transition metal being selected from the group consisting of manganese, nickel, chromium, vanadium, iron, cobalt and copper.

9. The lithium secondary battery in accordance with claim 8, wherein the lithium-contained transition metal oxide has either a spinel structure or a spinel-like structure.

10. The lithium secondary battery in accordance with claim 8, wherein said lithium-contained transition metal oxide is an oxide with a normal spinel structure represented by the general formula:

$$Li_{1-y}Mn_{2-x}Me_xO_4$$

where Me represents a transition metal selected from the group consisting of Co, Cr, Cu and Fe, and where $0<x\leq1$ and $0\leq y\leq1$.

11. The lithium secondary battery in accordance with claim 8, wherein said lithium-contained transition metal oxide is an oxide with a normal spinel structure represented by the general formula:

$$Li_{1-y}Mn_{2-x}Ni_xO_4$$

where $0<x\leq0.5$ and $0\leq y\leq1$.

12. The lithium secondary battery in accordance with claim 8, wherein said lithium-contained transition metal oxide is an oxide with an inversed spinel structure represented by the general formula:

$$Li_{1-y}NiVO_4$$

where $0\leq y\leq1$.

13. The lithium secondary battery in accordance with claim 8, wherein said transition metal compound is a lithium-contained phosphate having an olivine structure represented by the general formula:

$$Li_{1-y}MePO_4$$

where Me represents a transition metal selected from the group consisting of Co, Ni, and Fe, and where $0\leq y\leq1$.

14. The lithium secondary battery in accordance with claim 1, wherein the lithium-contained transition metal compound has an olivine structure.

15. A lithium secondary battery comprising a positive electrode which contains a transition metal compound exhibiting a potential of not lower than 4.5 volts versus Li, a negative electrode and a sulfide based lithium ion conductive solid electrolyte, wherein said transition metal compound is a lithium-contained transition metal oxide, said transition metal being selected from the group consisting of manganese, nickel, chromium, vanadium, cobalt and copper.

* * * * *